2,917,745
COCONUT TREATING PROCESS AND PRODUCT

Daniel J. Kelley, East Paterson, and Samuel E. Lanham, West Caldwell, N.J., assignors to General Foods Corporation, White Plains, N.Y., a corporation of Delaware No Drawing. Application August 8, 1958
Serial No. 753,873

18 Claims. (Cl. 99—125)

This invention relates to new coconut products having improved texture, flavor, homogeneity, storability, and appearance and to a method of producing the same.

Fresh coconut meat is a substantially homogeneous mass consisting of radially arranged, generally six-sided, closely packed individual cells which have fairly rigid cell walls, and organized cell contents which appear to consist of an oily protoplasm containing colloidal proteinaceous material. The average water content of fresh coconut meat may be 50%. When fresh coconut meat is shipped, the expense of these operations is proportionately greater because of the large amount of water present. In addition to the difficulties inherent in handling the extra weight resulting from the water content, presence of such large amounts of moisture increases the rate of deterioration of the shelled coconut meat. The coconut meat spoils, becomes brown and moldy, and otherwise deteriorates sufficiently quickly to make it substantially impossible to store chunks or large pieces for any substantial period. It has been found that if the moisture content of the coconut meat is lowered, it may be stored for longer periods of time with a minimum of deterioration.

In an attempt to produce marketable dried coconut, various techniques have been applied to coconut chunks which may have dimensions of one-quarter to one-eighth inch. Drying coconut chunks of this size by conventional techniques is slow and tedious and it is not readily possible in a reasonable time to obtain a white product containing less than about 3.5% moisture. In fact, attempts to dehydrate chunks of coconut meat having dimension larger than about 0.25 to 0.50 inch have heretofore given a product which is undesirably dark brown in color, nontasty, and hard to the point of inedibility. Attempts to lower the moisture content of chunks of fresh coconut meat to about 1% or less (by weight) while simultaneously retaining the many desirable properties of the fresh meat, have been uniformly unsuccessful. Specifically the products prepared by the heretofore unsuccessful attempts to lower the moisture content of coconut chunks to the above-noted extent, have been extremely hard and leathery at the surfaces and difficult or impossible to chew. In some processes, the drying time has been so long that the coconut has spoiled even before the moisture content was reduced by any great amount.

It has not heretofore been possible by use of cenventional drying techniques known to those skilled-in-the-art to prepare a homogeneous, white, tasty, crisp, coconut chunk which has extended storage life as evidenced e.g. by resistance to discoloration. Furthermore, prior attempts to extend shelf life by reducing the moisture content of coconut chunks to 1% or less have not been successful because the steps employed to lower the moisture level to this point have in fact accelerated the deterioration of the coconut and thereby shortened its shelf life.

Those skilled-in-the-art have heretofore attempted to impart more desirable characteristics to dried coconut by using drying processes which have been successful with other foods. For example, it has been proposed to modify the various conditions of temperature, time, pressure, etc. or the physical techniques employed to get a product having the desired characteristics. None of these prior art processes—which are characterized by use of uneconomical operating conditions in complicated or delicate machinery requiring high capital outlay and high operating costs—has given a consistently satisfactory coconut product with respect to homogeneity, texture, flavor, appearance, storage life, and reconstitutability.

It is an object of this invention to provide novel forms of coconut. A further object of this invention is to disclose a process according to which the new coconut products of this invention may be prepared. Other objects will be apparent to those skilled-in-the-art on inspection of the following description.

According to certain aspects of this invention, coconut chunks may be prepared for drying by cooling from ambient temperature to about 28° F.–32°F., preferably to about 28° F.; further cooling from about 28° F. down to about 18° F., preferably from about 28° F. down to about 20° F., in a period of at least about two hours, and preferably from two to four and one-half hours; and preferably then further cooling to preferably about +10° F. to —10° F., preferably 0° F. The so-treated coconut may then be dried to give the desired dehydrated product.

Although the process of this invention may be carried out in connection with coconut pieces of any size, it is particularly effective when applied to pieces of such dimension, i.e. larger than about 0.25 inch, that they cannot be effectively dried to low moisture content by prior art processes. Under preferred operating conditions, the fresh coconut meat treated may be in the form of more or less cubical chunks and may typically be of size less than 0.5 inch in their greatest dimension e.g. 0.25 x 0.25 x 0.5 inch.

The coconut chunks which may be subjected to preliminary treatment including washing, are usually at ambient temperatures of e.g. 70° F.–90° F. This starting material will be cooled from ambient temperatures down to a temperature which preferably falls in the range of 28° F.–32° F., preferably 28° F. This may be done according to any desired technique, and may for example take place over a period from one-quarter to five hours.

The coconut which has been cooled down as above-noted is then further cooled within the range from 32° F.–28° F. down to 18° F.–20° F. Preferably this further cooling step will be from about 28° F. to about 20° F. It has been found that if the coconut is cooled from the upper limit to the lower limit of this temperature range in a period at least of about two hours and preferably two to four and one-half hours, the particular advantages of this invention are most readily obtained. If the cooling through this range is effected in a period which is less than about two hours, the desired texture and shelf life are not obtained in the product; although longer freezing times than four and one-half hours may be employed, no particular advantage accrues therefrom.

Under the preferred conditions of this invention the coconut which has been cooled to about 20° F.–18° F. may be further treated to permit attainment of a product which is somewhat more satisfactory by further cooling to temperature as low as —30° F., but preferably to within the range of +10° F. to —10° F., and preferably to about 0° F., in a time of e.g. fifteen minutes to two hours.

After freezing, the coconut is immediately ready for further treatment. If desired the frozen coconut can be permitted to thaw before being subjected to dehydration. However, thawing as a separate step is not necessary and whether or not it is done will depend upon the particular processing requirements which prevail. When thawing is done, the ensuing drying should preferably occur after not more than about three to four hours thereafter.

It is a particular feature of this invention that the coconut which has been cooled through the range of 32° F. down to 18° F.–20° F. in a period of at least about two hours may be dried by any of a wide variety of drying techniques with a minimum of required control. Under the preferred operating conditions however the so-cooled coconut may be dehydrated by air drying. According to one particular technique of air drying which has been found to be satisfactory, the frozen coconut chunks will be loaded on drying trays in shallow beds, preferably about 1.5 in. or less in depth. If desired, the coconut chunks may be dried in a monolayer, which may be about 0.25–0.5 inch in depth.

The loaded trays of coconut are placed within an air drier, which is a completely enclosed unit wherein conditions may readily be controlled. Typically such a unit is a Proctor and Schwartz air drier. Drying may be accomplished by passing air through the shallow bed of coconut at superficial air velocity of at least 100 feet per minute, and typically within the range of 100–150 feet per minute. Preferably a velocity of about 150 feet per minute may be employed. It has been found that operation at these air rates permits ready attainment of the novel product herein described.

Preferably the inlet air temperature to the drying operation is 140° F.–180° F., although for best results it will be at about 140° F.–170° F. When this air temperature is at the desired level of 140° F.–170° F., temperature of the coconut within the beds will not exceed about 120° F.–150° F.

Under the conditions of operation as indicated, the moisture content of the coconut drops quickly but without detrimental effect upon the coconut. The moisture content, which originally was about 50%, may drop to e.g. about 20% after one-half hour and thence to about 10% after one hour. Further drying brings the moisture content down e.g. to about 5% after one and one-half hours, to about 2.5% after two hours, to about 1.5% after three hours, and to about 1% after somewhat over 4 hours. Usually a drying period of four to five hours is sufficient to bring the moisture content to about 1% or less. Under certain conditions, however, it may be desirable to reduce the moisture content only to 5%, and this can be done as indicated within a period as brief as one and one-half hours. It is found however that particularly desirable results in terms of extended storage life and desirable texture are obtained when the drying process is continued until the moisture content of the product coconut is about 1% or less.

The dehydrated coconut product of this invention has substantially the same physical shape and size as that of the fresh coconut chunk from which it was prepared. The bulk of the chunks is crisp and friable and apparently comprises a plurality of coconut cells in arrangement more or less similar to that present in fresh coconut. The surface of the product possesses a desirable crispness on chewing and it appears to be just slightly more resistant to chewing than is the bulk of the chunk. As the chunk is eaten, the consumer derives therefrom a pleasant mouth character based upon the crisp, crunchy nature of the coconut product. It has a characteristically snow white color, a fine texture, and a highly desirable flavor which endures over an extended storage life. Its bulk density may be of the order of 15 pounds per cubic foot in contrast to that of fresh coconut which is about 30–40 pounds per cubic foot. Inspection of the chunks reveals that they contain a large number of minute perforations or voids. The product is superficially dry and crispy. When it has a moisture content of about 1% or less, as it will when prepared under the most desirable conditions, it can be stored for extended periods without deterioration as evidenced e.g. by browning.

It is a feature of this invention that when a vacuum drying technique is to be employed, the dehydrated coconut chunks may be obtained by slowly freezing coconut at temperature less than 30° F., and then vacuum drying the coconut chunks in shallow beds at pressure of about 20–200 mm. Hg and shelf temperature of 130° F.–180° F. for nine to twenty-five hours to yield a homogeneous dehydrated product containing preferably less than about 1% moisture.

Although the process of this aspect of the invention may be carried out in connection with coconut pieces of any size, it is particularly effective when applied to pieces of such dimensions, i.e. larger than about 0.25 inch, that they cannot be effectively dried to low moisture content by prior art processes. Under preferred operating conditions, the fresh coconut meat treated may be in the form of more-or-less cubical chunks and may typically be of size less than 0.5 inch in their greatest dimension e.g. 0.25 x 0.25 x 0.5 inch.

These chunks which may be subjected to preliminary treatment including washing, are then frozen. Freezing may be effected at coconut temperatures less than 30° F. to attain a consistently superior product, in terms of homogeneity, color, and shelf life. When the coconut chunks are frozen in the form of a monolayer, it is found that freezing may be effected at coconut temperatures of 30° F. if e.g. it is done between two cold plates. Although improvement in product quality may be obtained by freezing at coconut temperatures less than minus 40° F., it will usually not be desired to go to these lower temperatures.

Freezing under these conditions at atmospheric pressure will be conducted for time which is at least long enough to insure that the coconut meat is substantially homogeneously frozen. This may be as long as sixteen or eighteen hours to twenty-four hours. Although longer total freezing times may be employed, they do not give any improvement in the desired homogeneous texture or shelf life of the product. Freezing to coconut temperature of minus 30° F. to minus 40° F. for eighteen to twenty-four hours gives a frozen coconut which can readily be vacuum dried to yield a product possessing the highly desirable properties hereinbefore set forth, particularly extended storage life and homogeneity. After freezing, the coconut is immediately ready for further treatment. If desired, it can be permitted to thaw before being subjected to dehydration. However, thawing as a separate step is not necessary and whether or not it is done will depend upon the particular processing requirements which prevail. When the coconut is thawed, drying will preferably be started within three to four hours.

To effect vacuum drying, the frozen coconut chunks will be loaded on drying trays in shallow beds, less than about 2 inches in depth and preferably about 1.5 inches or less in depth. If desired, the coconut chunks may be dried in a monolayer (i.e. a single layer) which will be 0.25–0.5 inch in depth.

The loaded trays of coconut are then placed within a vacuum shelf drier, which is a completely enclosed unit wherein conditions may readily be controlled. Typically such a unit is a Stokes vacuum drier.

Drying is accomplished by passing circulating water, entering at 130° F.–180° F., through the trays on which the coconut chunks rest. Preferably the water will enter at temperature of about 160° F.–180° F., and under the prevailing conditions, the temperature of the coconut will be not more than about 140° F.–150° F. The term "shelf temperature" will be used to designate the temperature of the entering water although it will be understood by those skilled-in-the-art that this temperature may vary within the vacuum drier. During the drying period of nine to twenty-five hours, but more typically twelve to seventeen hours, the pressure within the vacuum chamber will be maintained at 20–200 mm. Hg, and preferably 40–100 mm. Hg.

Under the conditions of operation as indicated, the moisture content of the coconut drops at controlled rate which gives the resulting product its desired homogeneity, texture, and extended shelf life. The moisture content may for example drop from its original level of about 50% to following values at the times indicated:

| Times-hours: | Moisture percent |
| --- | --- |
| 0 | 50 |
| 4 | 41 |
| 8 | 29 |
| 10 | 21 |
| 12 | 12.5 |
| 14 | 5 |
| 15 | 2.5 |
| 16 | 1.5 |
| 17 | 1 |

Although if desired, the drying may be halted when the product contains 5% moisture or less, particularly desirable properties in the products of this invention are obtained when the drying process is continued until the moisture content of the product coconut is about 1% or less.

The dehydrated coconut product so prepared is particularly characterized by its substantially complete homogeneity. If a cross-section be taken through an edge of a chunk, it will be found that portions of the coconut in the interior and at the surface are substantially identical with respect to moisture content, snow-white color, and many other chemical and physical properties. The bulk density of the preferred product is of the order of 15 pounds per cubic foot, as compared to fresh coconut which may be 30–40 pounds per cubic foot. The product is uniformly dry and crisp. When it has a moisture content of about 1% or less, as it will when prepared under the preferred conditions, it can be stored for prolonged periods without deterioration as evidenced e.g. by loss of homogeneity or by discoloration.

According to a specific example of the process of this invention, fresh coconuts were shelled, peeled, subjected to pre-treatment including washing, and chopped into pieces having dimensions approximately 0.25 x 0.25 x 0.5 in. Moisture content of the pieces averaged about 50%.

The pieces were placed within a freezing box which contained a refrigeration circuit which could be maintained at controlled temperature. In this example, the charge coconut was at temperature about 75° F. Refrigerant was passed through the trays at temperature of 25° F. for a period of two hours. At the end of this time, the temperature of the coconut was 28° F.

When the temperature of the coconut had reached this point, the temperature of the coolant was lowered to about 10° F. Cooling continued for a period of three hours during which time the temperature of the coconut dropped from 28° F. to 20° F.

The frozen particles of coconut were then placed in layers having a depth of 1.5 inches in a Proctor & Schwartz air dryer having 4 square feet drying trays. Air at temperature of 173° F. was passed through beds of coconut at a superficial velocity of 100 feet per minute.

Drying was continued for a period of four hours and fifteen minutes, and during drying, moisture content was checked. After one hour moisture content was 10%; after two hours moisture content was 2.5%; after three hours it was 1.7%; after four hours it was 1.3%; at the conclusion of the test it was 0.95%.

The product had excellent texture as determined by visual inspection and test. It was snow-white in color and crisp, crunchy, and friable. The entire mass was porous and contained numerous small voids and perforations. The bulk density was about 15 pounds per cubic foot. The surface appeared to be just slightly more resistant to the bite than was the bulk of the dried coconut chunk. The chunks had a true rich flavor and a characteristically sweet taste.

On storage it was found that the product of this invention possessed characteristics which are superior to those of fresh coconut or of conventionally dried coconut. Whereas conventionally dried coconut may turn brown after a period of about 6–9 months, the product of this invention retained its snow-white color for periods of 18 months or longer.

It is particularly characteristic of this new product that it may be toasted to obtain a light brown surface thereon, and that this toasted product otherwise possesses all the advantages of the untoasted product. In comparison, a coconut chunk dried by conventional procedures is rendered even less edible and more hard by toasting.

It is possible to readily reconstitute the dehydrated product hereinbefore described by combining the same with reconstituting liquid, e.g. water or aqueous solution of a sweetening agent e.g. sugar, to get an improved reconstituted product characterized by highly desirable texture, flavor, and appearance and which more closely resembles fresh coconut than does the reconstituted conventionally dried product. Reconstitution to a moisture level of e.g. 50% occurs very quickly and usually in a matter of minutes. A conventionally dried product would not be fully reconstituted for several hours under the same conditions and, in any event, it could not be reconstituted to as high a moisture level.

According to another specific embodiment of this invention, the same coconut was cooled from ambient temperature of 75° F. to 30° F. in a period of two hours. This coconut was then further cooled from 30° F. down to 20° F. in a period of three hours. It was then cooled further to 0° F. It was then dried in a Proctor and Schwartz drier as described in the above example. The coconut prepared according to this specific embodiment possessed all the advantageous features noted in connection with the product of the first example. It was, however, found to possess a somewhat more crisp character and it reconstituted more quickly than did the coconut of the above example.

According to still another specific example of the process of this invention, fresh coconuts were shelled, peeled, subjected to pretreatment including washing, and chopped into pieces having dimensions 0.25 x 0.25 x 0.5 inch. Moisture content of the chunks averaged about 50%. The coconut was placed in trays and permitted to stand for about sixteen hours in a cold room maintained at about minus 30° F.

At the end of this time, the frozen coconut chunks were placed on a 3 square feet drying tray in a layer having a depth of 1.5 inches. The tray was then placed within a Stokes vacuum drier, and water entering at 160° F. was circulated through the shelves thereof. The unit was sealed, and the pressure was reduced to 28 inches of mercury (40 mm. Hg), and maintained at this level during the drying period of about seventeen hours.

As drying proceeded, the moisture content of the coconut dropped from its initial value of about 50%. After about five hours drying, it was down to about 37%. After ten hours of drying the level was at about 21%. 10% moisture content was reached after twelve and one-hours, and 5% was reached at fourteen hours. At fifteen hours the level was down to 2.5%, and 1% moisture content was obtained at seventeen hours. Although moisture content as high as 5% may be utilized, it is preferred that the level be reduced to 1%.

At the end of the drying period of seventeen hours, the product was withdrawn from the drier and tested. It was snow-white in color, crisp, crunchy, and friable and it had a bulk density of about 15 pounds per cubic foot. Inspection revealed that the mass was porous and contained numerous small voids and perforations.

On storage it was found that the product of this invention possessed characteristics which are superior to those of conventionally dried coconut. Whereas conventionally dried coconut turned brown after a period of 6–9 months, the product of this invention retained its snow-white color for periods of 18 months or longer.

It is particularly characteristic of this new product that it may be toasted to obtain a light brown surface thereon, and that this toasted product otherwise possesses all the advantages of the untoasted product. In comparison, a coconut chunk dried by conventional procedures is rendered even less edible and more hard by toasting.

It is possible to readily reconstitute the dehydrated product hereinbefore described by combining the same with reconstituting liquid, e.g. water or aqueous solution of a sweetening agent e.g. sugar, to get an improved reconstituted product characterized by highly desirable texture, flavor homogeneity, and appearance and which more closely resembles fresh coconut than does the reconstituted conventionally dried product. Reconstitution to a moisture level of e.g. 50% occurs very quickly and usually in a matter of minutes. A conventionally dried product would not be fully reconstituted for several hours under the same conditions and, in any event, it could not be reconstituted to as high a moisture level.

It will be apparent to those skilled-in-the-art that although the invention has been described in terms of specific examples, various modifications and changes may be made which fall within the scope of the invention.

This application is a continuation-in-part of application Serial Number 601,369, filed August 1, 1956 for New Coconut Products and Process for Producing the Same, by the same inventors, now abandoned.

What is claimed is:

1. A crisp, dry, and tasty dehydrated coconut product comprising coconut containing about 1%–5% water, having substantially the same shape and size as the fresh coconut chunk from which it was prepared, a bulk density of 15 pounds per cubic foot, a white color, and extended storage life, prepared by cooling coconut from 28° F.–32° F. down to 18° F.–20° F. in a period of at least two hours, and dehydrating said coconut to a moisture content of 1%–5% water.

2. A crisp, dry, and tasty dehydrated coconut product comprising coconut containing about 1%–5% water, having substantially the same shape and size as the fresh coconut chunk from which it was prepared, a bulk density of 15 pounds per cubic foot, a white color, and extended storage life, prepared by cooling coconut from ambient temperature to 28° F.–32° F., further cooling to 18° F.–20° F. in a period of two to four and one-half hours, and dehydrating said coconut to a moisture content of 1%–5% water.

3. A crisp, dry, and tasty dehydrated coconut product characterized by substantially complete homogeneity, extended storage life, bulk density of about 15 pounds per cubic foot, moisture content of less than about 5%, and shape and size substantially the same as the fresh coconut from which it was prepared by the process comprising slowly freezing chunks of fresh coconut meat at coconut temperature less than 30° F., forming the coconut meat into a shallow bed, and vacuum drying said coconut at pressure of about 20–200 mm. Hg and shelf temperature of 130° F.–180° F.

4. A crisp, dry, and tasty dehydrated coconut product characterized by substantially complete homogeneity, extended storage life, bulk density of about 15 pounds per cubic foot, moisture content of less than about 1%, and shape and size substantially the same as the fresh coconut from which it was prepared by the process comprising slowly freezing chunks of fresh coconut meat at temperature less than minus 30° F., forming the coconut meat into a shallow bed, and vacuum drying said coconut at pressure of about 20–200 mm. Hg and shelf temperature of 130° F.–180° F. for a period of nine to twenty-five hours.

5. The method of preparing a dehydrated coconut product which comprises cooling coconut from 28° F.–32° F. down to 18°–20° F. in a period of at least about two hours, and drying said coconut to a low moisture content.

6. The method of preparing a dehydrated coconut product which comprises cooling coconut from ambient temperature to 28° F.–32° F., further cooling said coconut down to 18° F.–20° F. in a period of at least about two hours, and drying said coconut to a moisture content of less than about 5%.

7. The method of preparing a dehydrated coconut product which comprises cooling coconut from ambient temperature to 28° F., further cooling said coconut down to 20° F. in a period of at least about two hours, further cooling said coconut, and drying said coconut to a moisture content of less than about 5%.

8. The method of preparing a dehydrated coconut product which comprises cooling coconut from ambient temperature to 28° F.–32° F., further cooling said coconut down to 18° F.–20° F. in a period of at least about two hours, further cooling said coconut to +10° F. to −10° F., and drying said coconut to a moisture content of less than about 5%.

9. The method of preparing a dehydrated coconut product which comprises cooling coconut from ambient temperature to 28° F.–32° F., further cooling said coconut down to 18° F.–20° F. in two to four and one-half hours, further cooling said coconut to 0° F., and drying said coconut to a moisture content of less than about 5%.

10. The method of preparing a dehydrated coconut product which comprises cooling coconut from ambient temperature to about 28° F., further cooling said coconut down to about 20° F. in two to four and one-half hours, further cooling said coconut to about 0° F., and drying said coconut to a moisture content of less than about 5%.

11. The method of preparing a dehydrated coconut product which comprises slowly freezing chunks of fresh coconut meat at coconut temperature less than 30° F., and vacuum drying the coconut chunks in a shallow bed at pressure of about 20–200 mm. Hg and shelf temperature of 130° F.–180° F. for nine to twenty-five hours.

12. The method of preparing a dehydrated coconut product which comprises forming chunks of fresh coconut into a monolayer, slowly freezing said coconut at coconut temperature less than 30° F., and vacuum drying the coconut in a shallow bed at pressure of about 20–200 mm. Hg and shelf temperature of 130° F.–180° F. for nine to twenty-five hours.

13. The method of preparing a dehydrated coconut product which comprises slowly freezing chunks of fresh coconut meat at coconut temperature less than minus 30° F., forming said coconut meat into a shallow bed having a depth less than about two inches, and vacuum drying the coconut in said shallow bed at pressure of about 20–200 mm. Hg and shelf temperature of 130° F.–180° F. for nine to twenty-five hours thereby producing coconut meat which is homogeneous, crisp, dry, tasty and containing less than about 1% moisture by weight.

14. The method of preparing a dehydrated coconut product as claimed in claim 13 wherein said fresh coconut meat is frozen at minus 30° F. to minus 40° F.

15. The method of preparing a dehydrated coconut product as claimed in claim 13 wherein the maximum temperature of the coconut is about 140° F.–150° F. during the vacuum drying.

16. The method of preparing a dehydrated coconut product which comprises slowly freezing chunks of fresh coconut meat at coconut temperatures of minus 30° F. to minus 40° F., forming said coconut meat into a shallow bed having depth less than about two inches, and vacuum drying the coconut in said shallow bed at pressure of 40–100 mm. Hg and shelf temperature of 160° F.–180° F. for twelve to seventeen hours thereby producing coconut meat which is homogeneous, crisp, dry, tasty, and containing less than about 1% moisture by weight.

17. The method of preparing a dehydrated chunk coconut product which comprises slowly freezing chunks of fresh coconut meat for sixteen to twenty-four hours at coconut temperature less than 30° F., and vacuum drying the coconut chunks in a shallow bed at pressure of about 20–200 mm. Hg and shelf temperature of 130° F.–180° F. for nine to twenty-five hours.

18. The method of preparing a dehydrated chunk coconut product which comprises slowly freezing chunks of fresh coconut meat for sixteen to twenty-four hours at coconut temperatures of minus 30° F. to minus 40° F., forming said coconut meat into a shallow bed having depth less than about two inches, and vacuum drying the coconut in said shallow bed at pressure of 40–100 mm. Hg and shelf temperature of 160° F.–180° F. for twelve to seventeen hours thereby producing coconut chunks which are homogeneous, dry, crisp, tasty, and containing less than about 1% moisture by weight.

References Cited in the file of this patent

UNITED STATES PATENTS

| | | |
|---|---|---|
| 2,147,752 | Northcutt | Feb. 21, 1939 |
| 2,534,484 | Thompson et al. | Dec. 19, 1950 |
| 2,583,697 | Hendry et al. | Jan. 29, 1952 |

FOREIGN PATENTS

| | | |
|---|---|---|
| 539,477 | Great Britain | Sept. 12, 1941 |

OTHER REFERENCES

Desiccating Shredded Coconut, by Buchanan, Food Industries, October 1928, pp. 9–12.